(12) United States Patent
Scotton et al.

(10) Patent No.: US 8,150,833 B1
(45) Date of Patent: Apr. 3, 2012

(54) SYSTEM, METHOD AND COMPUTER PROGRAM PRODUCT FOR STORING A FORMULA HAVING FIRST AND SECOND OBJECT FIELDS

(75) Inventors: Mary Scotton, Oakland, CA (US); Walter Macklem, San Francisco, CA (US); Eric Bezar, Oakland, CA (US); Jesse Collins, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 310 days.

(21) Appl. No.: 12/436,691

(22) Filed: May 6, 2009

Related U.S. Application Data

(60) Provisional application No. 61/051,165, filed on May 7, 2008.

(51) Int. Cl.
*G06F 7/00* (2006.01)
*G06F 17/30* (2006.01)

(52) U.S. Cl. ........ 707/713; 707/714; 707/715; 707/716; 707/736; 707/759

(58) Field of Classification Search .................. 707/705, 707/713, 714, 715, 716, 736, 759
See application file for complete search history.

(56) References Cited

U.S. PATENT DOCUMENTS

| | | | |
|---|---|---|---|
| 6,016,488 A * | 1/2000 | Bosworth et al. | 707/999.004 |
| 6,353,830 B1 * | 3/2002 | Yee et al. | 707/999.101 |
| 7,209,929 B2 | 4/2007 | Dominguez, Jr. et al. | 707/103 |
| 7,366,716 B2 * | 4/2008 | Agrawal et al. | 707/999.002 |
| 2003/0233404 A1 | 12/2003 | Hopkins | 709/203 |
| 2005/0065925 A1 * | 3/2005 | Weissman et al. | 707/4 |
| 2005/0223022 A1 | 10/2005 | Weissman et al. | 707/102 |
| 2005/0283478 A1 | 12/2005 | Choi et al. | 707/9 |
| 2006/0047636 A1 * | 3/2006 | Mohania et al. | 707/3 |
| 2006/0206834 A1 | 9/2006 | Fisher et al. | 715/777 |
| 2006/0259509 A1 * | 11/2006 | Stolte et al. | 707/102 |
| 2008/0010243 A1 | 1/2008 | Weissman et al. | 707/2 |
| 2008/0294754 A1 * | 11/2008 | Lu et al. | 709/220 |
| 2009/0019022 A1 * | 1/2009 | Schallert et al. | 707/4 |
| 2009/0083615 A1 * | 3/2009 | Kotler et al. | 715/219 |

OTHER PUBLICATIONS

U.S. Appl. No. 60/828,192, filed Oct. 4, 2006.

* cited by examiner

*Primary Examiner* — Hares Jami
(74) *Attorney, Agent, or Firm* — Zilka-Kotab, PC

(57) ABSTRACT

In accordance with embodiments, there are provided mechanisms and methods for storing a formula having first and second object fields. These mechanisms and methods for storing a formula having first and second object fields can allow access to data from related object types other than the object type being currently accessed. The ability of embodiments to provide such access may allow access to additional contents of a database for performing validations, calculations, etc.

16 Claims, 5 Drawing Sheets

| Opportunity Custom Fields & Relationships | | New   Field Dependencies |
|---|---|---|
| Action | Field Label | Data Type |
| Edit \| Del | asdasd | Formula (Currency) |
| Edit \| Del | dfsdfsd | Roll-Up Summary (CO... uct) |
| Edit \| Del | Discount Percent | Percent(16, 2) |
| Edit \| Del | How many children? | Roll-Up Summary (COUNT Opp Child) |
| Edit \| Del | Opp Discount | Formula (Percent) |
| Edit \| Del | Role Limits | Lookup(Role Limits) |
| Edit \| Del | Total Licenses for Opp | Roll-Up Summary (SUM Opportunity Product) |
| Edit \| Del | Total List Price | Roll-Up Summary (SUM Opportunity Product) |

Tooltip (302 → 304): "This formula references related objects Tell me more..."

FIGURE 3

SYSTEM, METHOD AND COMPUTER PROGRAM PRODUCT FOR STORING A FORMULA HAVING FIRST AND SECOND OBJECT FIELDS

CLAIM OF PRIORITY

This application claims the benefit of U.S. Provisional Patent Application 61/051,165 entitled "Method and System for Providing Cross Object Formula Fields in On-Demand Services," by Scotton et al., filed May 7, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to database systems, and more particularly to storing formulas relating to such database systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, data may be accessed from a particular object type utilizing an expression language, such as a formula. The formula may allow access to data from a particular object type for various purposes, including data retrieval, data modification, data deletion, etc.

There is often a desire to access data from related object types other than the object type being currently accessed using the formula. To date, access has been restricted only to the current object type. Unfortunately, such limitations severely inhibit the ability of a user to access additional contents of the database using the formula.

BRIEF SUMMARY

In accordance with embodiments, there are provided mechanisms and methods for storing a formula having first and second object fields. These mechanisms and methods for storing a formula having first and second object fields can allow access to data from related object types other than the object type being currently accessed. The ability of embodiments to provide such access may allow access to additional contents of a database for performing validations, calculations, etc.

In an embodiment and by way of example, a method is provided for storing a formula having first and second object fields. In use, a plurality of object definitions, including a first object definition and a second object definition, are received. Additionally, the first object definition includes a first object field, and the second object definition includes a second object field. Further, a formula having the first object field as a first operand, and the second object field as a second operand, is stored.

While the present invention is described with reference to an embodiment in which techniques storing a formula having first and second object fields are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

FIG. 3 shows an exemplary list interface, in accordance with one embodiment.

DETAILED DESCRIPTION

General Overview

Systems and methods are provided for storing a formula having first and second object fields.

To date, access to object types using formulas has been restricted only to the object type being currently accessed using the formula. Unfortunately, such limitations severely inhibit the ability of a user to access additional contents of a database.

Thus, mechanisms and methods are provided herein for storing a formula having first and second object fields, where the first object field is included within a first object definition and the second object field is included within a second object definition. The ability of embodiments to provide such access may allow access to additional contents of the database for performing validations, calculations, etc.

Next, mechanisms and methods for storing a formula having first and second object fields will be described with reference to exemplary embodiments.

Figure 1:
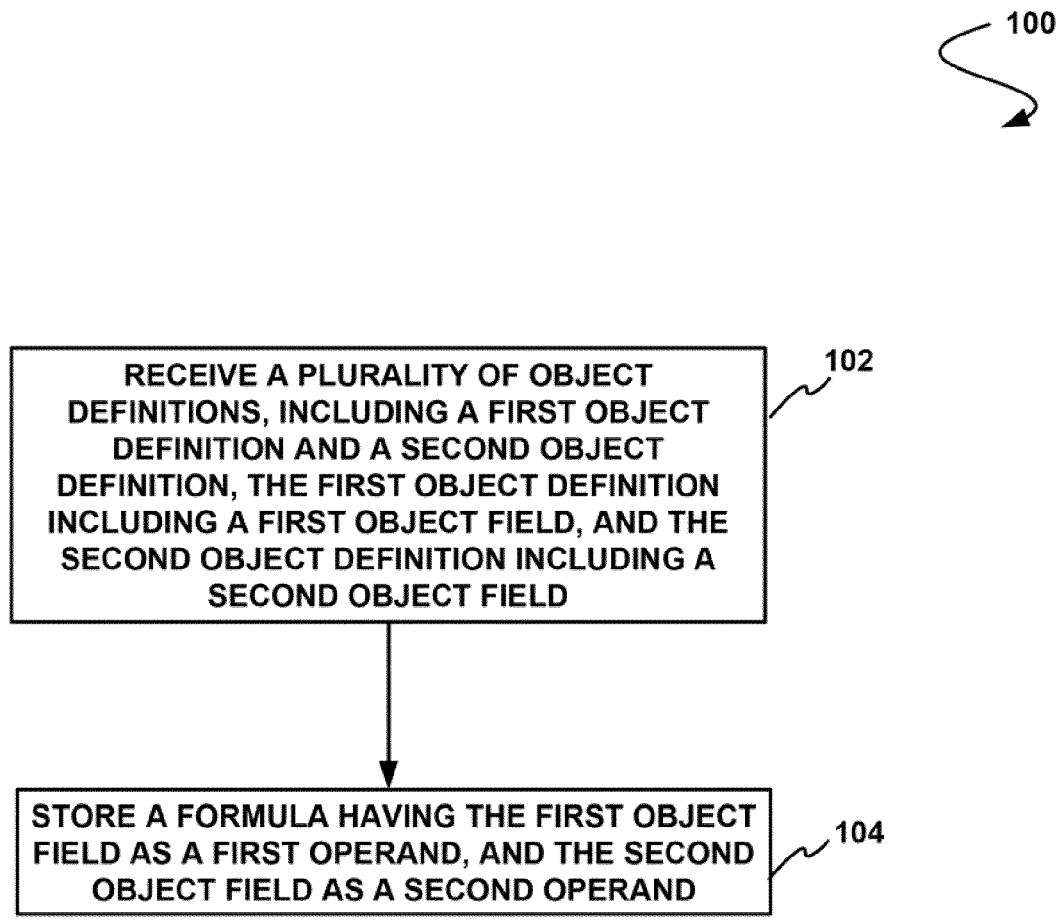
FIG. 1 shows a method for storing a formula having first and second object fields, in accordance with one embodiment.

FIG. 1 shows a method 100 for storing a formula having first and second object fields, in accordance with one embodiment. As shown, a plurality of object definitions, including a first object definition and a second object definition, are received. See operation 102.

In the context of the present description, an object definition may include any definition of a database object. In one embodiment, the object definition may correspond to an object of a particular object type, which may include one or more portions of a database entity, such as a database table. Examples of database tables include account tables, user tables, opportunity tables, contact tables, etc. Additionally, such database tables may be user defined. In another embodiment, the first and second object definitions may correspond to objects of different object type. For example, the first object definition may correspond to all or part of one database table, and the second object definition may correspond to all or part of a different database table. Additionally, in one embodiment, the object definition may include a custom object definition. For example, the object definition may include a definition of a custom object type. In another embodiment, the object definition may include a standard object definition.

In another embodiment, the plurality of object definitions may be received by a software program. For example, the plurality of object definitions may be received by a formula editor. Furthermore, the plurality of object definitions may be received from an on demand service. For example, the plurality of object definitions may be received from a tenant of a multi-tenant on demand service.

Additionally, the first object definition includes a first object field, and the second object definition includes a second object field. An object field may include any field from the respective object defined by the object definition. For example, the object field may correspond to a column on a database table. Therefore, the first object field may include any field from a first object, and the second object field may include any field from a second object.

In one embodiment, the first object field may be a relationship field to the second object.

Further, a formula having the first object field as a first operand and the second object field as a second operand is stored, as shown in operation 104. In the context of the present description, the formula may include any statement made using an expression language. In one embodiment, the formula may be used to access or manipulate data in a database. For example, the formula may be used to access a field of an object. In another example, the formula can be used to create derived fields on an object that reference additional fields of the object in order to perform calculations. In another embodiment, the formula may be used to drive business logic. For example, the formula may result in a Boolean value, and a workflow may be performed on an object depending on the Boolean value. In another embodiment, the formula may include a cross-object formula that allows a field from a related object to be used alongside fields in a primary object.

Additionally, an operand may include any portion of the formula. For example, the operand may include a variable used within the formula. In one embodiment, the first operand and the second operand may be separated using dot notation. For example, the first operand may be a relationship field (e.g. a foreign key) on the first object which links the first object to the second object. Further, the second operand may be a field of the second object that is being referenced by the first operand.

In another embodiment, the first operand may be specified as a cross-object relationship field that refers to the second object. In yet another embodiment, the second operand may be a field on the second object. In this way, the formula may refer to fields on related objects that are not being currently accessed.

In one exemplary embodiment, the first object definition may correspond to a first object that is currently being accessed. For example, the first object definition may correspond to a primary object, where at least a portion of the primary object is currently being viewed, loaded, saved, or otherwise accessed by a user in a transaction. For instance, a single database row of the primary object may be currently accessed. Additionally, the second object definition may correspond to a second object that is not currently being accessed. For example, the second object definition may correspond to a related object that is not currently being accessed. Therefore, in one embodiment, in order to access a field of the related object in the formula alongside a field of the primary object while currently accessing the primary object, the formula may specify the second operand as the name of the related object combined by a dot notation with the name of the related object field. In another embodiment, the formula may specify the second operand as a cross-object relationship field that refers to the related object, combined by a dot notation with the name of the related object field, where the cross-object relationship field resides on the primary object.

For instance, while viewing a "contact" object in a user interface, a user may desire to view a revenue field from an additional "account" object displayed along with the "contact" object fields on a detail display page. In order to achieve this, a cross-object formula may be written that refers to "account.revenue," where "account" is either a name of the additional object or a name of the cross-object relationship field that refers to the additional "account" object, and "revenue" is the additional object field that is referenced.

It should be noted that in one embodiment, if the cross-object relationship field is used, the name of the cross-object relationship field may be different from the name of the object it refers to. For example, the cross-object relationship field that refers to the "account" object may be named "accountkey," and as a result, a cross-object formula may be written that refers to "accountkey.revenue," where "accountkey" is the name of the cross-object relationship field, and "revenue" is the object field that is referenced.

Application Level Embodiment

In one embodiment, the formula may be evaluated at the application level. For example, the application may be evaluated at an appserver tier. In another embodiment, objects may be loaded from a database, and the formula may be compiled into simple objects that are evaluated using a programming implementation such as Java©. In this embodiment, all information may need to be loaded from the database, and as a result, the current embodiment may be used on small sets of objects, and may be used for interface display purposes as well as the insertion, updating, and/or deletion of objects, among other things.

In one exemplary application level embodiment, a single object may be worked on for the duration of a transaction. For example, as illustrated above, while viewing a "contact" object in a user interface, a user may desire to view a revenue field from an "account" object displayed along with the "contact" object fields on a detail display page. In this exemplary embodiment, the formula may be compiled and executed. During execution of the formula, when the name of the additional object or the name of the cross-object relationship field that refers to the additional object is encountered, all or part of the additional object may be loaded from the database. In this way, only a single additional object needs to be loaded, resulting in an efficient operation.

In another exemplary application level embodiment, multiple objects may be concurrently accessed during a transaction. For example, 200 objects of a particular object type may be concurrently saved through an Application Program Interface (API), where workflow logic includes a cross-object formula that refers to an additional object field. In this embodiment, one database roundtrip may be performed in order to load all additional objects at the same time. In order to accomplish this, a heuristic is used to identify all additional objects in the formula so that all additional objects may be loaded in bulk. In one embodiment, all additional objects may be loaded when the first of the particular objects is loading its additional object.

Additionally, the heuristic may subscribe to load and save object events. For example, when an object is loaded or saved, a group may be stored that records which custom or standard objects are currently used in the bulk operation. When an additional object or the name of the cross-object relationship field that refers to the additional object is encountered, the heuristic is queried for every other particular object in the current group and all additional objects may be loaded in bulk. In this way, during typical bulk operations, objects may be loaded and saved in the same groups, resulting in an efficient operation.

Database Level Embodiment

In another embodiment, the formula may be evaluated at the database level. For example, the formula may be compiled directly into a Structured Query Language (SQL) and may be evaluated inline with main database queries. This embodiment may be useful for large data set operations and scanning many rows in the database via queries, and as a result, the current embodiment may be used for reporting, filtering, related lists, etc.

Previously, formulas might only refer to fields on a primary object, and as a result SQL generation might only include the primary database table and reference columns on that primary database table. However, in one embodiment, SQL generation may now include related database tables and columns that are needed for cross-object references.

For example, when compiling a formula and generating necessary SQL, when an object field is encountered that is on a different object type, the cross-relationship field path may be registered with a query generation engine responsible for generating the necessary SQL. In this way, after full compilation of all formulas that will be used in a database query, the query generation engine may resolve all cross-object relationships to their corresponding database tables and may insert the proper join semantics across foreign keys.

Additionally, cross-object relationship fields may use master-detail relationships or nullable lookup relationships. Due to the nullable relationships, all joins used for cross-object formulas may include right-outer joins in order to ensure that null relationships do not restrict rows returned on the primary database table. Further, cross-object relationship fields may reuse pre-existing joins in the SQL if the same cross-object relationship field is used in more than one formula. This may result in more efficient SQL and better database performance.

Chaining Fields

In one embodiment, additional definitions or the cross-object relationship fields that refer to the additional definitions may be chained, or "multihopped," in order to access additional objects that are more than one degree away. For example, the formula may have an additional object field as an additional operand, where the additional object field is located more than one degree away from the currently accessed object. For instance, the additional operand may be a relationship field which links one object to another object.

In another example, while accessing a "contact" page, an account owner's email address may be desired. This may be obtained by constructing a formula including the following: "account.owner.emailaddress." Additionally, application level embodiments may work in a nested manner in order to load additional objects, and database level embodiments may require chained table outer-joins.

Limits

In still another embodiment, limits may be placed on the formula. For example, a limit on a number of additional objects accessed in a formula may be enforced. For instance, a cross-object formula limit may be imposed per object type. In one embodiment, a limit of X may be imposed, where X cross-object relationship fields may be used across all formulas for a particular object type. As an example, if the object type is "contact," and a limit of three is imposed, a formula may have at most one cross-object formula field that references three additional object types (e.g., "account," "opportunity," and "user"). In another example, under the same limit of three, a formula may have at most one cross-object formula field that references a multihop relationship, such as "account.case.solution.description." In yet another example, under the same limit of three, three different formulas may have at most one cross object relationship field each.

In one embodiment, the limit may have a default value. In another embodiment, the limit may have a maximum value. In still another embodiment, permission may be necessary in order to change the limit. Additionally, tracking access of objects may be performed in order to enforce the limit.

As an option, the count on cross object relationship fields may come from a distinct set of references, such that, for example, two different "contact" cross object formulas both using the same "account" relationship field only counts as one towards the limit instead of two.

In this way, the formula may scale and perform well in a multi-tenant on-demand environment, as any single tenant may not create too much system load to disturb other tenants residing on the multi-tenant on-demand environment (e.g. residing on a same instance).

In other various embodiments, a formula may reference one or more portions of an additional formula on a parent record. As an example, this may occur even if the additional formula references more than one object. As another example, this may be used to reference "multihop" relationships, such as grandparent (2-hop) relationships.

In another embodiment, the aforementioned features may enable the referencing of fields in parent records. For example, the referencing of fields in parent records for both master-detail relationships and lookup relationships may be enabled. Additionally, in one embodiment, calculations may be performed on child records based on data in the parent record using one or more formulas. In another embodiment, fields from the parent may be displayed when viewing the child record, which may be useful for many-to-many relationships. Further, in one embodiment, fields in an object that are multiple "hops" away may be referenced. Also, as an option, self-relationships may be accessed.

Further, in one embodiment, one or more formulas that have more than one object as operands may be available in one or more reports. For example, the formulas may be available in reports, list views, and related lists of an interface. In another example, the formulas may include fields from a parent record in a detail view, a related list, or a list view by a child record by directly referencing the parent field in a formula field. Additionally, as an option, parent records may be added to a page layout. Further, as yet another option, formulas may have access to all data within a system, such that a formula may access a field despite a user not having access to that field. Still yet, as another option, formulas may have access to all standard and custom fields on the parent.

Additionally, as an option, the language used in the formulas may be available in multiple contexts. For example, the formulas may be used in the context of custom formula fields, validation rules, default values, workflow field updates, custom sControls, custom buttons and links, and workflow rules. Further, as another option formulas may be supported in bulk for reporting, list views, related lists, etc. Further still, as yet another option, merge maps may be refactored in order to support template expressions. Optionally, a custom report type may be implemented.

Also, as an option, a formula may reference one or more relationships. For example, the formula may reference standard master-detail relationships, in order to calculate an opp line item amount based on a opportunity discount field, to calculate a contact scoring based on an account ranking field, etc. Further, as another option, the formula may reference custom master-detail relationships. In another example, the formula may reference user lookups (e.g. "createdby," "lastmodifiedby," "custom," "owner," "self," etc.), for example, in writing a workflow rule formula that has a conditional such as "if createdby.name='mary'", in writing a workflow rule formula that has a conditional such as "if owner.name='DAB queue'", etc. Further still, as yet another option, the formula may reference standard lookup relationships, such as upon displaying contact information on a case detail page and displaying parent account fields on child accounts, and may reference custom lookup relationships, such as upon displaying fields from a position record and a candidate record in an application detail page (e.g. a many-to-many junction object).

Additionally, as an option to support standard lookups, code may be implemented that ignores sharing rules. Further, as another option, a field selection interface may be scaled to support selecting grandparent objects and fields, for example, to reference account owner fields (e.g., email address, profile, etc.) from a contact object. Further still, as yet another option, an owner field may exist that can either be a user or a queue, and polymorphic keys may be resolved in formulas, for example, to reference an email address of a contact that is the "who" field in a task or event.

Optionally, in this way, a language used to create formulas may be extended to allow referencing of additional fields. For example, fields in a parent object may be referenced in a formula using a dot notation. As yet another option, in this way, business logic for validations and/or calculations may depend on data in the parent record.

Figure 2:
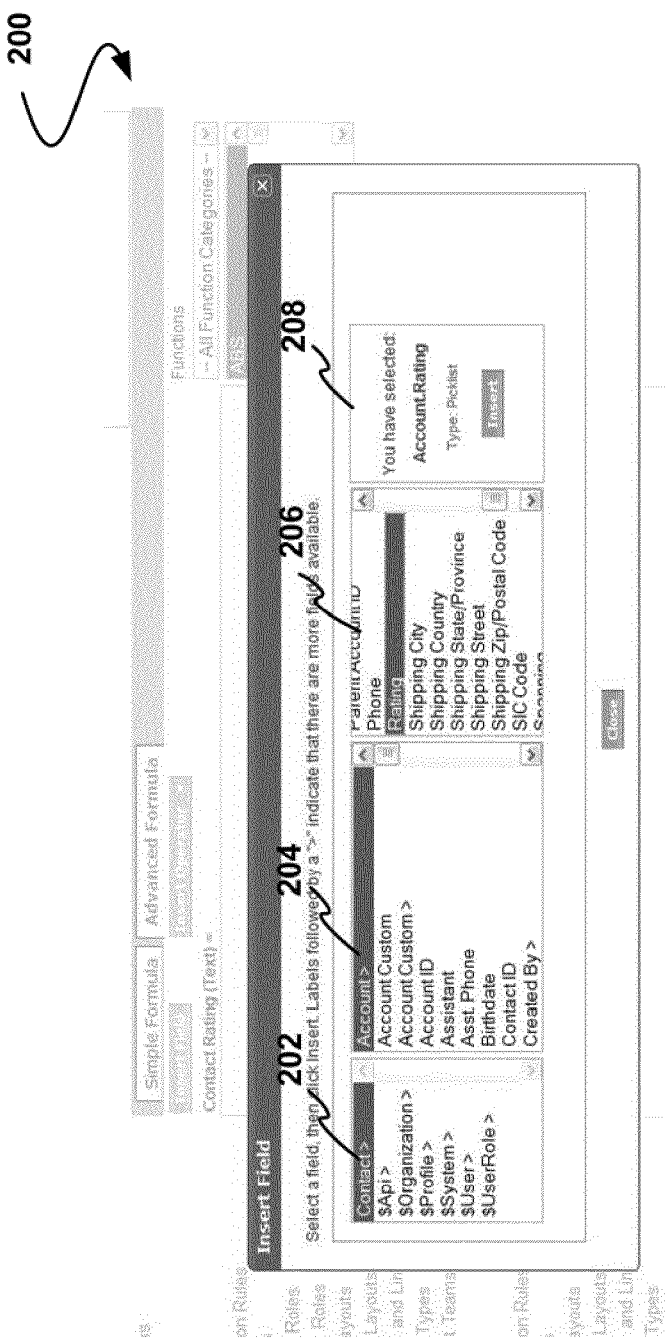
FIG. 2 shows an exemplary operand insertion interface, in accordance with one embodiment.

FIG. 2 shows an exemplary operand insertion interface 200, in accordance with one embodiment. As an option, the interface 200 may be implemented in the context of the functionality of FIG. 1. Of course, however, the interface 200 may be carried out in any desired environment. Further, the aforementioned definitions may apply during the present description.

As shown, window 202 allows for a user to select an object from a list of objects. For example, the window 202 may allow the selection of an object for insertion into a formula. In another example, the objects may be scrolled through in the window 202. In another embodiment, related objects that may be accessed by the formula may have a symbol appended to their object name, for example, a "$" sign. In yet another embodiment, the primary object for the formula may not have a symbol appended to their object name.

Additionally, window 204 allows a user to select an object field associated with the object selected in window 202. Further, window 206 allows a user to select an additional field associated with the object selected in window 202. In one example, this may enable chaining, or "multihopping," of fields within the formula. Further still, window 208 may illustrate an operand to be inserted into the formula based on the selection of the object in window 202 and fields in window 204 and in window 206.

In one embodiment, a tab may be added to a user interface (e.g. a formula editor user interface) to allow for use of the operand insertion interface 200. For example, a tab named "new merge field picker" may be added to the user interface. In another embodiment, a user may need permission in order to create formulas. For example, a user may need a "customize applications" permission to create formulas. In yet another embodiment, the number of objects used in the formula may be limited using manually provisioned permissions. For example, the manually provisioned permissions may be accessible using a tab on the user interface.

Additionally, in one embodiment, a device may be used to identify object and fields. For example, a spider may be used in order to identify objects and related fields that the formula refers to. Further, as an option, uploading of formulas that have particular characteristics may be blocked. For example, uploading of a package from a tenant that has formulas depending upon field-conditional perms (e.g. multi-currency, b2c, territory management, etc.) may be blocked.

FIG. 3 shows an exemplary list interface 300, in accordance with one embodiment. As an option, the interface 300 may be implemented in the context of the functionality of FIGS. 1 and 2. Of course, however, the interface 300 may be carried out in any desired environment. Further, the aforementioned definitions may apply during the present description.

As shown, the list interface 300 includes an icon 302 that indicates whether a listed formula contains multiple objects as operands. In one embodiment, the icon 302 may be placed to the right of the text indicating a formula. As an option, the icon 302 may be associated with the formula and may further be placed anywhere in the list interface 300 indicating the associated with the formula. In another embodiment, the icon 302 may include hover text 304. For example, the hover text 304 may include additional information about the formula, such as an indication that the formula contains multiple objects as operands, a link to additional information such as a help document considering limitations and considerations of such formulas, etc.

System Overview

Figure 4:
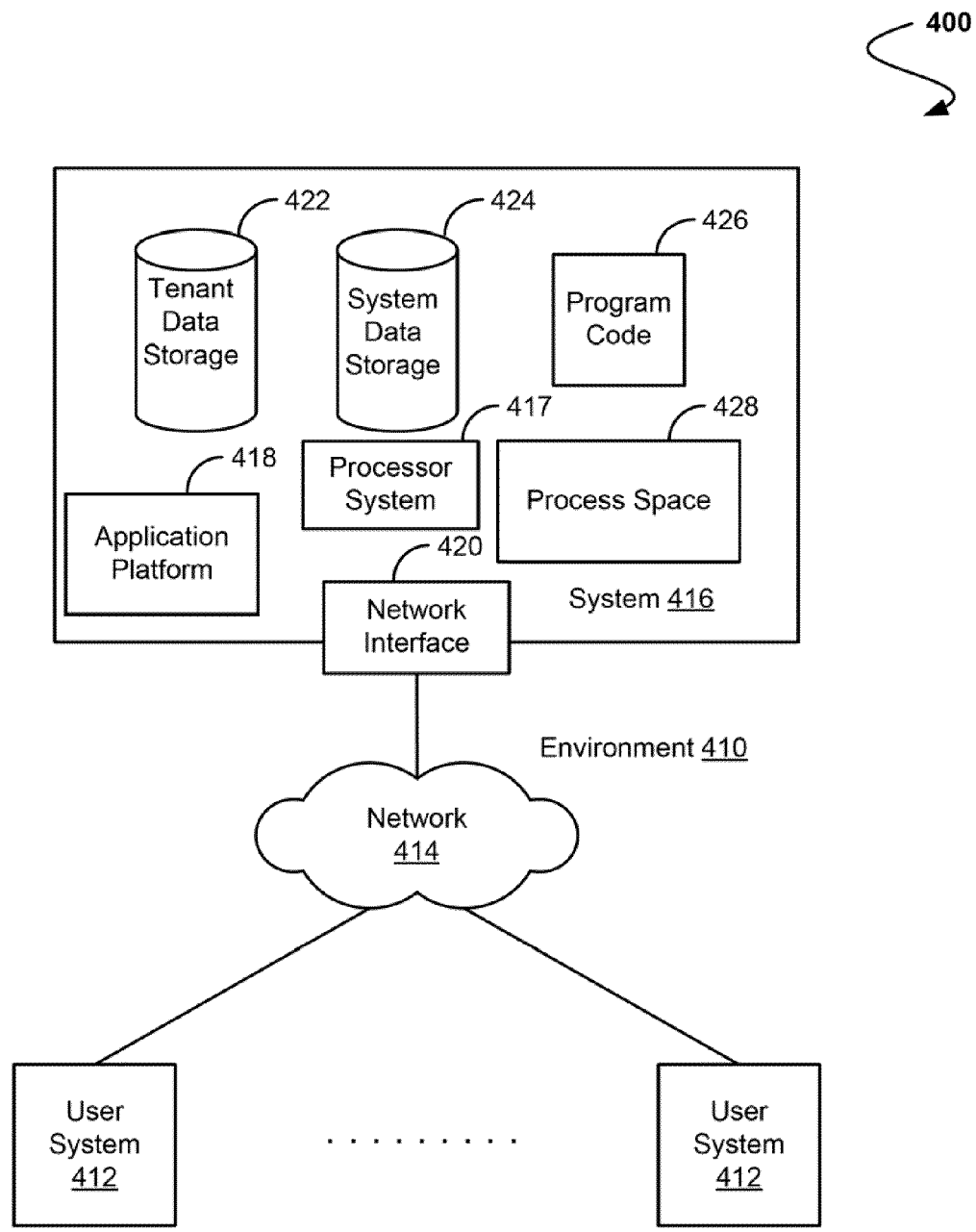
FIG. 4 illustrates a block diagram of an example of an environment wherein an on-demand database service might be used.

FIG. 4 illustrates a block diagram of an environment 410 wherein an on-demand database service might be used. As an option, any of the previously described embodiments of the foregoing figures may or may not be implemented in the context of the environment 410. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices.

As illustrated in FIG. 4 (and in more detail in FIG. 5) user systems 412 might interact via a network with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
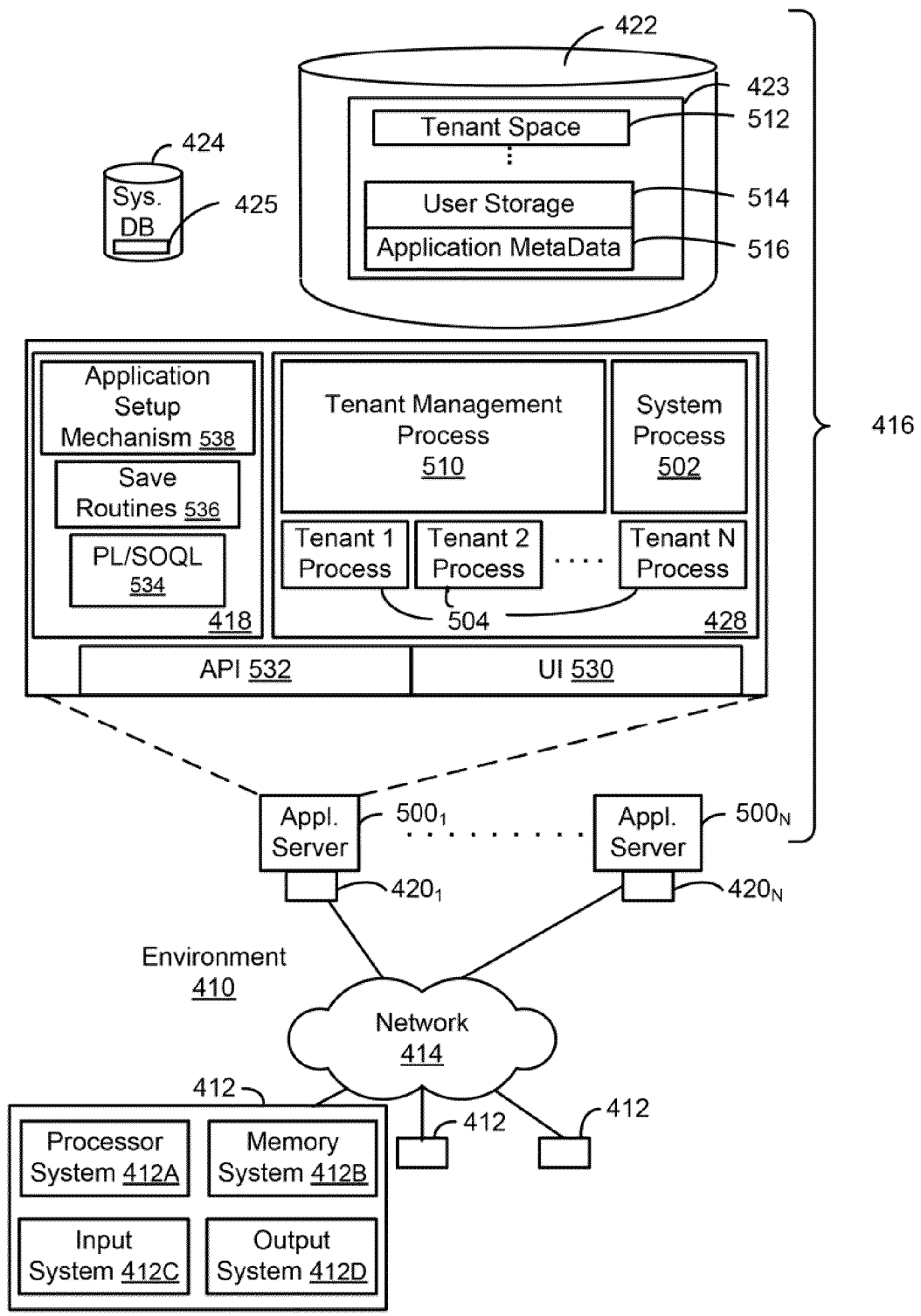
FIG. 5 illustrates a block diagram of an embodiment of elements of FIG. 4 and various possible interconnections between these elements.

One arrangement for elements of system 416 is shown in FIG. 5, including a network interface 420, application platform 418, tenant data storage 422 for tenant data 423, system data storage 424 for system data accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417 of FIG. 4, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other non-transitory volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER. FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; US2006/0206834, titled "SYSTEMS AND METHODS FOR IMPLEMENTING MULTI-APPLICATION TABS AND TAB SETS," filed Mar. 8, 2005; and/or US2008/0010243, titled "METHOD AND SYSTEM FOR PUSHING DATA TO A PLURALITY OF DEVICES IN AN ON-DEMAND SERVICE ENVIRONMENT," filed Jun. 1, 2007; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such Modifications and similar arrangements.

The invention claimed is:

1. A method, comprising:
receiving a plurality of object definitions, including a first object definition and a second object definition, the first object definition including a first object field, and the second object definition including a second object field;
storing a formula having the first object field as a first operand, and the second object field as a second operand;
displaying a first object defined by the first object definition to a user, including displaying the first object field;
based on the display of the first object to the user, receiving a request from the user to view the second object field;
executing the formula in response to the request, wherein only a second object defined by the second object definition is loaded from a database storing the second object via the execution of the formula; and
displaying to the user, along with the first object field, the second object field from the loaded second object;
wherein a limit on a number of objects accessed in the formula is enforced;
wherein the limit is configured based on a type of the first object.

2. The method of claim 1, wherein the first operand and the second operand are separated using dot notation.

3. The method of claim 1, the first operand is a relationship field on the first object which links the first object to the second object, and the second operand is a field of the second object that is referenced by the first operand.

4. The method of claim 1, wherein the plurality of object definitions are received from a tenant of a multi-tenant on demand service.

5. The method of claim 1, wherein the first object field is a relationship field to the second object.

6. The method of claim 1, wherein the first object definition corresponds to a current object that is currently being accessed.

7. The method of claim 1, wherein the second operand is a field on the second object.

8. The method of claim 7, wherein the cross-object relationship field resides on the first object.

9. The method of claim 1, wherein the formula is made using an expression language.

10. The method of claim 1, wherein the plurality of object definitions are custom object definitions or standard object definitions.

11. The method of claim 1, wherein the formula has an additional object field as an additional operand, where the additional object field is located more than one degree away from a currently accessed object.

12. The method of claim 11, wherein the additional operand includes a relationship field which links one object to another object.

13. The method of claim 1, wherein the limit has a default value.

14. The method of claim 1, wherein the limit has a maximum value.

15. A non-transitory machine-readable storage medium storing one or more sequences of instructions which, when executed by one or more processors, cause the one or more processors to carry out the steps of:
receiving a plurality of object definitions, including a first object definition and a second object definition, the first object definition including a first object field, and the second object definition including a second object field;
storing a formula having the first object field as a first operand, and the second object field as a second operand;
displaying a first object defined by the first object definition to a user, including displaying the first object field;
based on the display of the first object to the user, receiving a request from the user to view the second object field;
executing the formula in response to the request, wherein only a second object defined by the second object definition is loaded from a database storing the second object via the execution of the formula; and
displaying to the user, along with the first object field, the second object field from the loaded second object;
wherein a limit on a number of objects accessed in the formula is enforced;
wherein the limit is configured based on a type of the first object.

16. An apparatus, comprising:
a processor; and
one or more stored sequences of instructions which, when executed by the processor, cause the processor to carry out the steps of:
receiving a plurality of object definitions, including a first object definition and a second object definition, the first object definition including a first object field, and the second object definition including a second object field;
storing a formula having the first object field as a first operand, and the second object field as a second operand;
displaying a first object defined by the first object definition to a user, including displaying the first object field;
based on the display of the first object to the user, receiving a request from the user to view the second object field;
executing the formula in response to the request, wherein only a second object defined by the second object definition is loaded from a database storing the second object via the execution of the formula; and
displaying to the user, along with the first object field, the second object field from the loaded second object;
wherein a limit on a number of objects accessed in the formula is enforced;
wherein the limit is configured based on a type of the first object.

* * * * *